Sept. 22, 1925.  1,554,379
M. SIWECKI
AUTOMATIC STOP MOTION FOR JACK SPOOLERS
Filed Nov. 1, 1924  3 Sheets-Sheet 1

INVENTOR.
Martin Siwecki
BY John A. Bommhardt
ATTORNEY.

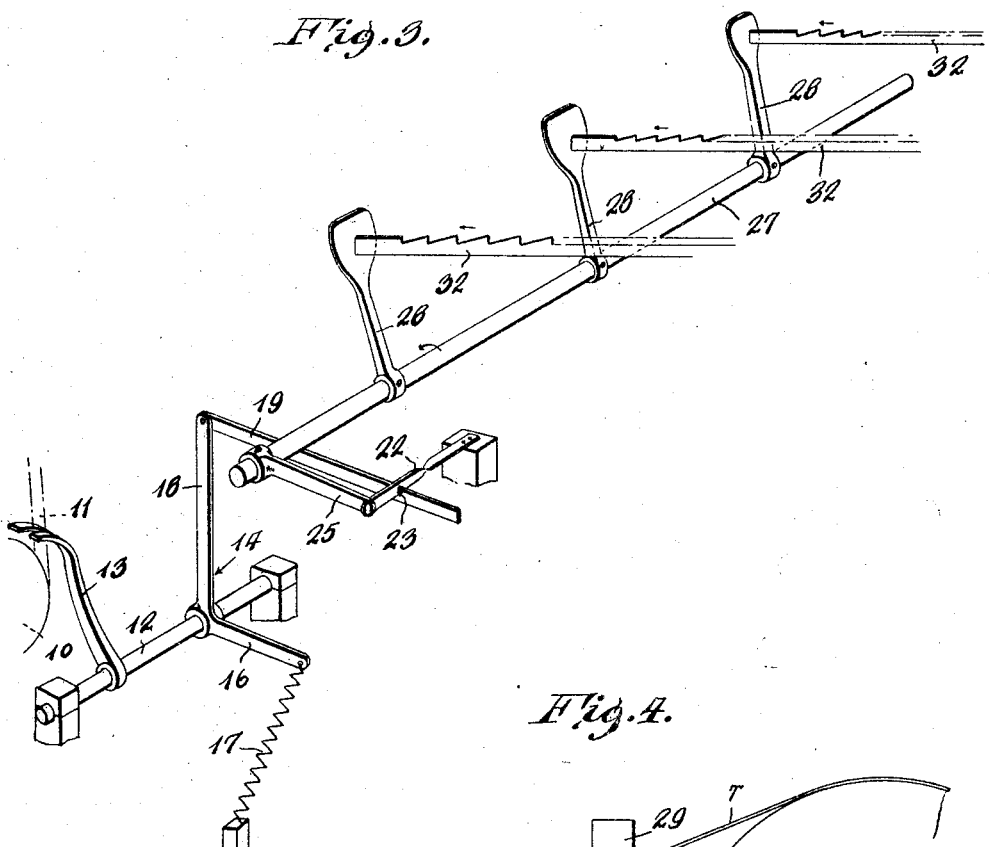
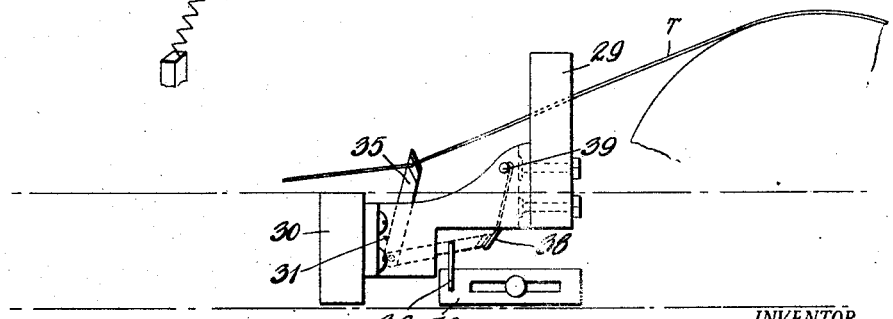

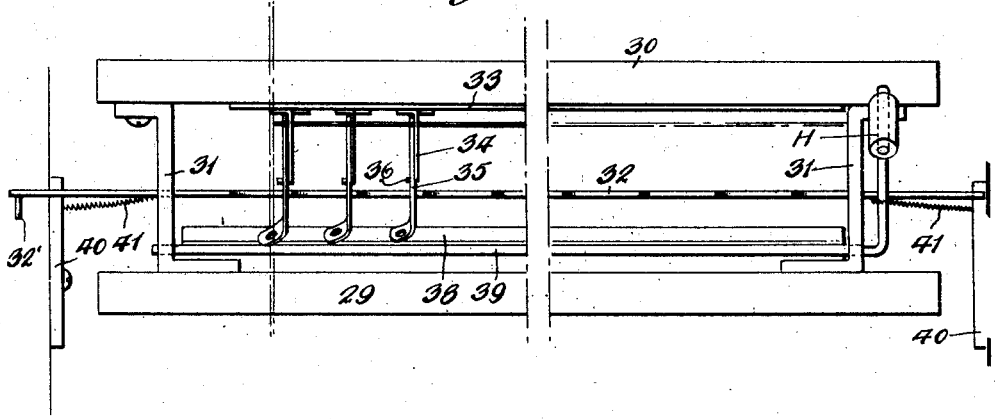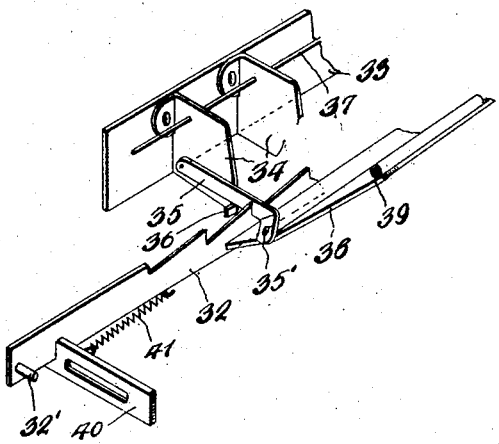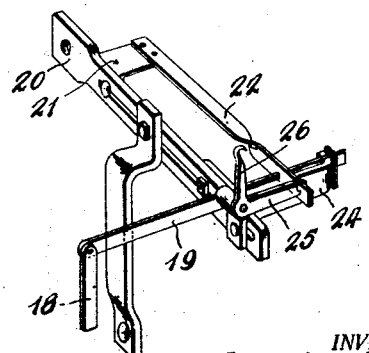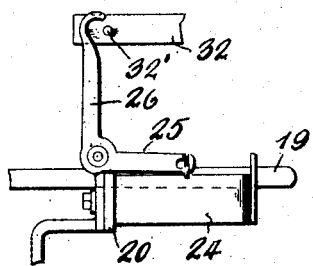

Patented Sept. 22, 1925.

1,554,379

UNITED STATES PATENT OFFICE.

MARTIN SIWECKI, OF CLEVELAND, OHIO.

AUTOMATIC STOP MOTION FOR JACK SPOOLERS.

Application filed November 1, 1924. Serial No. 747,351.

*To all whom it may concern:*

Be it known that I, MARTIN SIWECKI, a citizen of the United States, residing at Cleveland, in the county of Cuyahoga and State of Ohio, have invented certain new and useful Improvements in Automatic Stop Motions for Jack Spoolers, of which the following is a specification.

This invention relates to improvements in automatic stop motion for jack spoolers having for an object to provide means which will quickly and invariably actuate the stop motion upon the breaking of one or more threads and further may be manually operated when desired.

Another object is to provide a battery of trip devices so arranged that a single stop motion may be employed in connection with a set of jack spoolers.

It is likewise an object to provide a stop motion of this character in which is included a minimum number of working parts compactly arranged, simply constructed and free from undue lost motion.

Other objects will be in part obvious and in part pointed out hereinafter.

In order that the invention and its mode of operation may be readily understood by others skilled in the art, I have in the accompanying drawings and in the following description based thereon set out the preferred embodiment thereof.

Figure 3 is a detail perspective view showing the manner in which the stop motion may be actuated by means of any of the tripping or actuating devices;

Figure 4 is a detail end elevation of the reed bar showing the trip device associated therewith;

Figure 5 is a plan view of the mechanism shown in Figure 4;

Figure 6 is a detail perspective view of a portion of the trip device;

Figure 7 is a detail perspective view of the release mechanism which is operated to permit functioning of a belt shifter; and Figure 8 is an end elevation of the parts shown in Figure 7.

Figure 1:
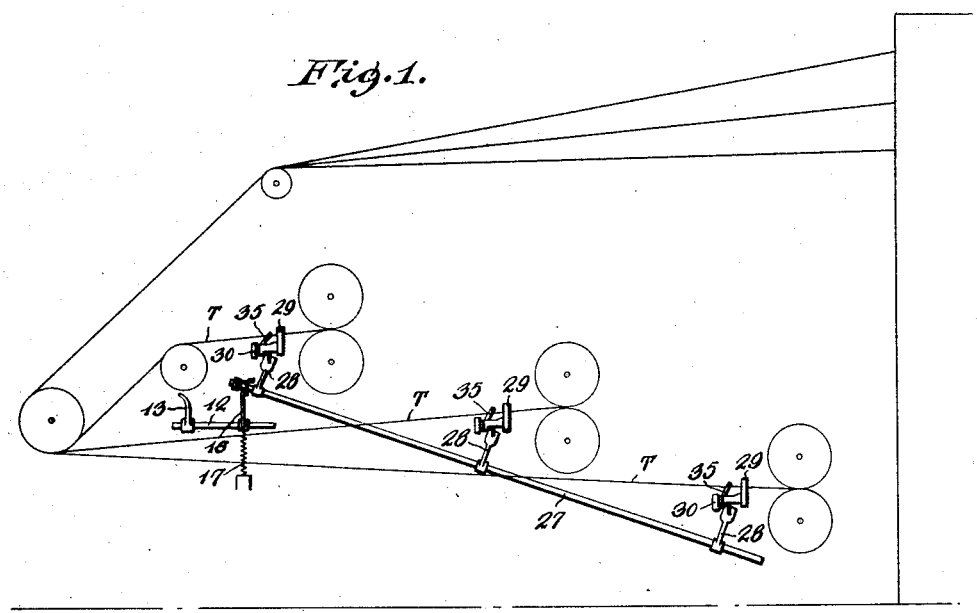
Figure 1 is a diagrammatic illustration showing the association of the automatic stop motion with jack spoolers.

This stop motion although particularly adapted for association with jack spoolers as illustrated, is applicable to many other textile machines wherein it is desired that with breaking of one or more threads, stopping of the machine will be automatically effected.

Having reference to the accompanying drawings throughout which similar characters of reference designate similar parts, this apparatus may be stated broadly as comprising a belt shifting mechanism, a belt shifter release mechanism, and a latch carrying frame which is associated with the usual reciprocable reed through which the threads being spooled are passed.

*Belt shifting mechanism.*

The belt shifting mechanism is associated with a loose pulley (not shown), a fixed pulley 10 and a driving belt 11 and consists in the arrangement of a shaft 12 at a point adjacent said pulleys. The ends of the shaft 12 are mounted in bearings of any preferred form, said shaft being oscillatively mounted and having fixed thereto a belt engaging arm 13 which is designed to shift the belt 11 from one pulley to the other at certain times. Keyed to this same shaft 12 is a lever 14 preferably of the bell crank type; one arm 16 being connected at its outer end to a pull spring 17 which at times oscillates the shaft and consequently shifts the belt B from the fixed pulley to the loose one. The second arm 18 of the bell crank lever 14 is connected to a sliding bar, said bar being normally locked in what I term a belt shifter lock mechanism.

*Belt shifter lock mechanism.*

This mechanism consists of a base bar 20 which is adjustably connected to the main frame of the spooler or textile machine (not shown). This base bar 20 is slotted longitudinally to provide for adjustable mounting of a bracket 21 which supports at one end a spring lock finger 22 whose outer end is releasably engageable in a notch 23 formed in the outer end portion of the aforementioned sliding bar 19. A substantially U-shaped arm 24 is adjustably mounted upon the base bar 20 at the other end of the slot and is notched to provide guide-ways in which the aforementioned sliding bar 19 of the belt shifter mechanism is arranged. Obviously, as illustrated in Figures 3 and 7 of the accompanying drawings, the normal positioning of the spring lock finger 22 retains the sliding bar 19 against movement and consequently tensions the pull spring 17. At times, particularly with the breaking of one or more of the threads being spooled it is necessary to release the sliding bar 19 so as to permit contraction of the pull spring 17 and consequent shifting of the driving belt 11 from the drive pulley to the loose pulley. This action is clear from a study of Figure 3. In order to free the sliding bar 19 for movement, a lever 25 which may be of the bell crank type or that shown in Figure 3, is associated with the release mechanism and connected to the free end of the spring locking finger 22. It is obvious that with raising of the lever 25 the spring stop finger 22 will be disengaged from the sliding bar 19 so as to permit functioning of the belt shifting mechanism.

In Figure 3, the release mechanism embodies a single arm lever 25 which is associated with a battery of spoolers, whereas in Figures 7 and 8 a bell crank lever including a hook carrying arm 26 is embodied for association with a single spooler.

Where a battery of spoolers is to be equipped with a stop mechanism of this character I provide a shaft 27 to which is keyed at spaced points trip arms 28 as shown in Figure 3 of the accompanying drawings. It is obvious that oscillation of the shaft 27 may be obtained through moving any of the trip arms 28. A latch carrying frame is associated with the usual reciprocable reed 29 through which the threads T are passed, the latches carried by the frame being adapted at certain times to engage a movable bar through oscillation of which the aforementioned mechanism is operated.

Latch carrying frame.

Figure 2:
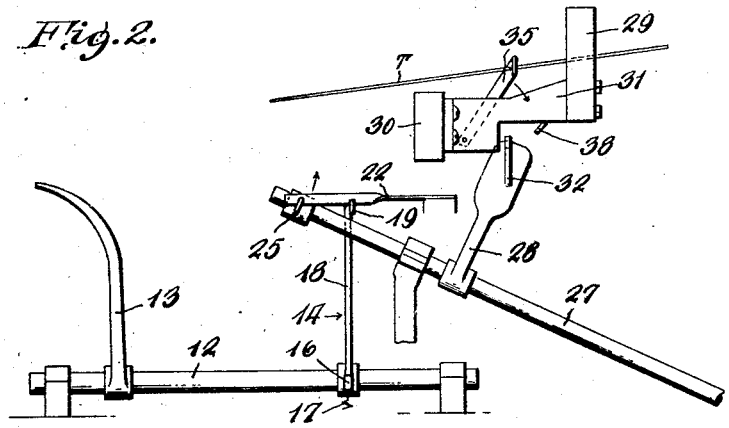
Figure 2 is a detail diagram of the relation of the stop motion and the transversely reciprocable reed bar.

This latch carrying frame consists of a transverse bar 30 spaced from and slightly below the front of the reed 29 and secured thereto by means of brackets 31 disposed at the opposite ends as shown in Figure 5. The lower portions of these brackets 31 are cut away as shown in Figures 2 and 4 to permit proper positioning of a toothed or rack bar 32 as will be hereinafter apparent. Secured to the inner face of the frame bar 30 is a metal strip 33 which carries at uniformly spaced points latch carrying plates 34. These plates 34 are riveted or otherwise secured to the strip 33 and are designed to pivotally support latches 35 as clearly shown in Figures 4 and 6 of the drawings. These latches 35 as stated are pivoted to the plates 34 and when in their lower-most position are readily engageable with the teeth of the aforementioned rack bar 32. In order to further limit the downward movement of the latches, each supporting plate 34 is provided with a stop finger 36 which engages the under face of the adjacent latch 35 as shown. Upward movement of each latch is limited through the arrangement of a stop rod 37 which extends through the entire set of latch supporting plates 34. A latch lifting bar 38 is connected to a transverse rod 39 whose ends are journaled in the end brackets 31 as is clear in Figure 5 and when it is desired to pass threads T through the eyes 35' of the latches this lifting bar is oscillated through movement of a handle H with the result that all of the eyes 35 are raised to the position shown in Figures 2 and 4, this being the normal position during operation of the machine.

The aforementioned rack bar has its ends slidably seated in supporting brackets 40 which are adjustably mounted upon the frame (not shown), is normally stationary, and is so held through action of coil springs 41 or the like elements acting uniformly upon the bar at its opposite ends. One end of the bar is provided with a finger 32' which is adapted to engage the aforementioned hook carrying arm 26 when the mechanism is to be operated. This rack bar may be manually operated to stop the machine at any time.

Operation.

It being understood that the several elements are positioned as shown in Figures 1 and 3, the operation is as follows:

It is presumed that one or more of the threads T have broken and consequently one or more of the latches 35 will drop to the position shown in dotted lines in Figure 4, thus engaging the teeth of the rack bar 32. It is understood that during this period the reed and the latch carrying frame are reciprocating transversely as a unit and upon dropping of one finger into engagement with the rack bar, it too will be moved with the reed. Whether the structure be that shown in Figure 3 or 7, the rack bar or bars will effect raising of the lever 25 and simultaneously disengage the spring stop finger 22 from the sliding bar 19 and allow the pull spring 17 to move the bell crank lever of the belt shifting mechanism. This operation results in movement of the belt engaging arm and consequent shifting of the belt from the driving pulley to the loose pulley thereby stopping the entire mechanism.

Manifestly, the construction shown is capable of considerable modification and such modification as may fall within the scope of my claims, I consider within the spirit of my invention.

I claim :—

1. In a stop motion of the class described, the combination of a reciprocable reed, thread supported pivoted latches associated and movable with the reed, a bar engageable with one of the latches upon breaking of a thread, pulley and belt mechanism, a belt shifter normally inactively positioned, and means for actuating the belt shifter, said bar being adapted to reciprocate with the reed at times to release the shifter actuating means.

2. In a stop motion of the class described, the combination of a reciprocable reed, thread supported pivoted latches associated and movable with the reed, a rack bar engageable with one of the latches upon breaking of a thread, pulley and belt mechanism, a belt shifter normally inactively positioned, means for actuating the belt shifter, said means comprising a lever fixed to move with the belt shifter, spring means tending to move the lever, and a releasable locking mechanism arranged to prevent actuation of the lever, said rack bar being movable through engagement with one of the latches to release the locking mechanism.

3. In a stop motion of the class described the combination of a reciprocable reed, a frame fixed to and movable with the reed, a set of latches movable with and pivoted to the frame, normally elevated and engageable with threads, a lift bar for elevating the latches, a rack bar arranged to be engaged by a latch upon breaking of a thread, a belt shifter mechanism, devices for normally locking the mechanism and means whereby said devices will be unlocked to permit functioning of the belt shifter upon engagement of a latch with the rack bar.

4. In a stop motion of the class described, the combination of a reciprocable reed, a belt shifter, spring means for actuating the belt shifter, releasable devices to normally prevent functioning of the belt shifter; and means associated with the reciprocable reed for releasing the devices to permit actuation of the belt shifter, said means comprising a shaft, a lever fixed to the shaft, a trip arm fixed to the shaft, a rack bar engageable at times with the trip arm, and a set of pivoted latches designed for individual engagement with the rack bar upon breaking of one or more threads.

5. In a stop motion of the class described, the combination of a reciprocable reed, a belt shifter, spring means for actuating the belt shifter, releasable devices to normally prevent functioning of the belt shifter; and means associated with the reciprocable reed for releasing the devices to permit actuating of the belt shifter, said means comprising a shaft, a lever fixed to the shaft, a trip arm fixed to the shaft, a rack bar engageable at times with the trip arm, a frame fixed to and reciprocable above the rack bar with the reed, a series of latches pivoted to the frame and normally elevated at one end to engage threads, and stops arranged to limit movement of the latches, said latches being individually engageable with the rack bar at times whereby to effect actuation of the belt shifter.

6. In a stop motion of the class described, the combination of a reciprocable reed, a belt shifter, spring means for actuating the belt shifter, releasable devices to normally prevent functioning of the belt shifter; and means associated with the reciprocable reed for releasing the devices to permit actuation of the belt shifter, said means comprising a shaft, a lever fixed to the shaft, a trip arm fixed to the shaft, a rack bar engageable at times with the trip arm, a frame fixed to and reciprocable above the rack bar with the reed, a series of latches pivoted to the frame, and normally elevated at one end to engage threads, and an elevating bar arranged to simultaneously lift the latches for engagement with threads, said latches being individually engageable with the rack bar at times to effect actuation of the belt shifter.

7. In a stop motion of the class described, the combination of a reciprocable reed, a frame reciprocable with the reed, latches pivoted to the frame and engageable with threads, a rack bar normally stationary below the latches, said rack bar being yieldably held against longitudinal sliding, said latches being individually engageable with the rack bar upon breaking of a thread, to effect movement of said bar, a belt shifter, locking devices to normally prevent actuation of the belt shifter and means engageable by the rack bar to release the belt shifter locking devices.

8. In a stop motion of the class described, the combination of motion transmitting means, means normally inactively positioned and movable to stop the motion transmitting means, a reciprocable reed, thread supported pivoted latches movable with the reed, and a bar engageable with one of the latches upon breaking of a thread and movable with the reed to actively position the second named means.

9. In a stop motion of the class described, a belt shifter actuating mechanism comprising a reciprocable reed, thread supported latches pivoted to and movable with the reed, and a bar normally stationary and capable of movement at times to actuate the belt shifter mechanism, said latches being engageable with the bar to effect movement thereof with breaking of a thread.

10. In a stop motion of the class described, a belt shifter actuating mechanism comprising, a reciprocable reed, thread supported latches pivoted to and movable with the reed, a bar arranged beneath the latches and yieldably held against shifting, and teeth carried by the bar and engageable with one of the latches upon breaking of a supporting thread, said bar being movable with the reed at times to actuate the belt shifter mechanism.

11. In a stop motion of the class described, a belt shifter actuating mechanism comprising a reciprocable reed, a set of spaced plates fixed to the reed, stop fingers carried by the plates, thread supported latches pivoted to the plates and limited in their downward movement by said stops, and a rack bar arranged beneath the latches and yieldably held at a pre-determined point, said rack bar being engageable at times with one of the latches and shiftable to actively position the belt shifter mechanism.

In testimony whereof, I affix my signature.

MARTIN SIWECKI.